United States Patent [19]

Clark

[11] 4,134,224
[45] Jan. 16, 1979

[54] FISHING LURES
[76] Inventor: Kenneth W. Clark, 6889 Curtis Dr., Coloma, Mich. 49038
[21] Appl. No.: 801,737
[22] Filed: May 31, 1977
[51] Int. Cl.² .......................... A01K 85/00
[52] U.S. Cl. .................. 43/42.05; 43/42.35; 43/42.36; 43/42.5
[58] Field of Search ........... 43/42, 42.05, 42.04, 43/42.35, 42.08, 42.47, 42.36, 42.5, 44.87

[56] References Cited
U.S. PATENT DOCUMENTS 3,388,495  6/1968  Minser ............... 43/42.05
3,685,191  8/1972  Metzger ............. 43/42.05

FOREIGN PATENT DOCUMENTS 710939  6/1954  United Kingdom ............... 43/42.36

Primary Examiner—Robert C. Watson
Attorney, Agent, or Firm—Oltsch, Knoblock & Hall

[57] ABSTRACT

A fishing lure having an elongated body with an angularly extending apertured diving plate and a line guide spaced longitudinally and rearwardly from the diving plate. A fishing line extends freely through a diving plate aperture and the line guide and has a hook attached thereto in a manner to push against the line guide to advance the lure body during trolling and retrieving.

7 Claims, 12 Drawing Figures

FISHING LURES

SUMMARY OF THE INVENTION

This invention relates to improvements in fishing lures.

Conventional artificial fishing lures, whether of the spoon type or of the plug type, have been characterized by attachment of the lure body to a line and by attachment of hooks to the lure body. Thus, in casting or trolling of the lures, the lure body is interposed in and has a predetermined relation between the fishing line and the fishhooks. This results in a pull by the line upon the lure body during trolling and during retrieval when casting, and thus pull imposes limitations upon the liveliness of the action of the lure in the water during such trolling and retrieval A further limitation is that the fishhook or hooks retain a predetermined relationship to the lure body configurations a fish has struck and during playing of the fish to land it. This relationship sometimes permits a hooked fish to manuever in a manner to use the body of the lure to assist it in freeing itself from the hook after the fish has struck the lure.

It is the primary object of this invention to provide a lure which avoids the foregoing characteristics of prior lures and produces a novel action of the lure in the water while trolling and retrieving and while landing a fish which has struck or been hooked.

A further object is to provide a fishing lure in which a fishing line has a hook connected directly thereto and in which the lure body is free for movement along a line and relative to the hook.

A further object is to provide a fishing lure having a pair of longitudinally spaced line engaging portions laterally displaced from the lure body to accommodate longitudinal movement of the lure body along the line.

A further object is to provide a fishing lure having a pair of longitudinally spaced line engaging portions wherein the rearmost portion is engageable by hook attaching means secured to the line, which hook attaching means propel the lure body at a point rearwardly spaced from the forward end of the body by a pushing action, as distinguished from lure propulsion by anchorage of a line adjacent to the forward end of the lure body.

Other objects will be apparent from the following specification.

DESCRIPTION OF THE PREFERRED EMBODIMENTS

Figure 1:
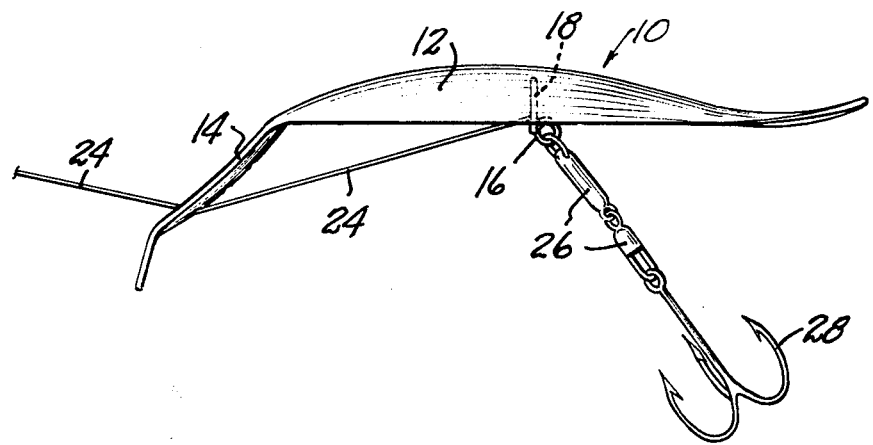
FIG. 1 is a view in side elevation of one embodiment of the invention.

Referring to the drawings, and particularly to FIGS. 1-7 which illustrate one embodiment of the invention, the numeral 10 designates the body of a fish lure of the spoon or plate type which may have any desired shape or configuration, here shown as characterized by a main or central portion 12 of generally concavo-convex configuration, from the forward end of which projects a diving plate portion 14 preferably extending forwardly at an angle to the axis of the main body portion 12. It will be understood that the specific configuration of the body 10 as shown is illustrative only and is not intended to be limiting, and that the body may assume any of a number of shapes and configurations characterized generally by a main longitudinally extending body portion from the front end of which extends an inclined diving plate.

Figure 3:
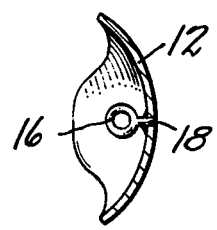
FIG. 3 is a transverse sectional view taken on line 3—3 of FIG. 2.

At a point preferably spaced slightly rearward of the longitudinal center of gravity of the lure body 10 the body portion 12 mounts a line guide, such as an eyelet 16, located generally along the longitudinal center line of the lure, that is, substantially equally spaced from the opposite side edges of the body. The eyelet 16 is preferably provided with a mounting portion or stem 18 by means of which it may be mounted or otherwise fixedly anchored to the body at a position which spaces the eyelet from the body so that it is laterally offset from the body in substantially the same direction in which the diving plate 14 projects laterally from body 12, as best seen in FIG. 3.

Figure 2:
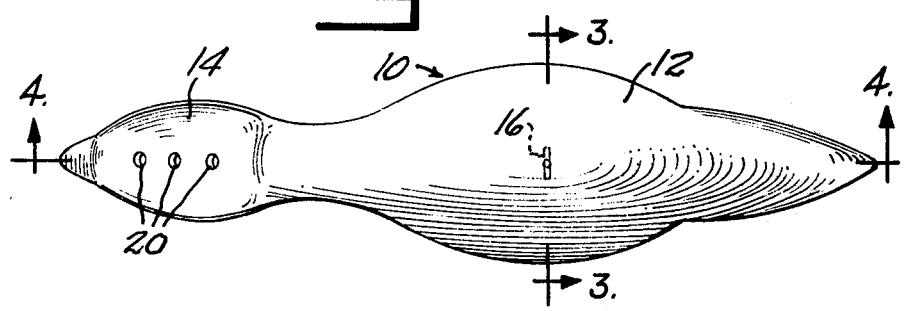
FIG. 2 is a top plan view of the lure shown in FIG. 1.
Figure 5:
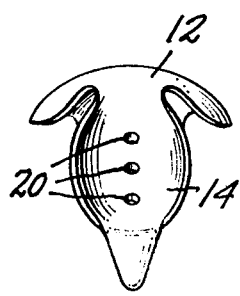
FIG. 5 is a front elevational view of the lure shown in FIGS. 1, 2 and 4.
Figure 6:
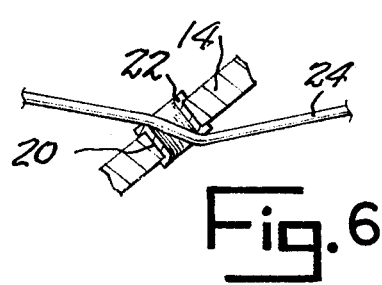
FIG. 6 is an enlarged fragmentary detail sectional view of the portion of the lure encircled at 6 in FIG. 4.

The dividing plate portion 14 is provided with one or a plurality of spaced apertures 20. The apertures 20 are preferably located along the longitudinal center line of the lure at selected intervals, as best seen in FIGS. 2 and 5. The apertures 20 are preferably provided with grommets 22, as best seen in FIG. 6, which may be formed of metal or plastic, and each of which has a bore of a diameter larger than the cross sectional dimension or thickness of a fishing line 24.

Figure 4:
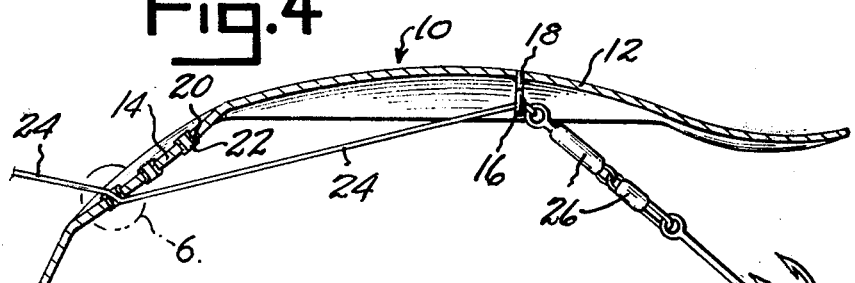
FIG. 4 is a longitudinal sectional view taken on line 4—4 of FIG. 2.
Figure 7:
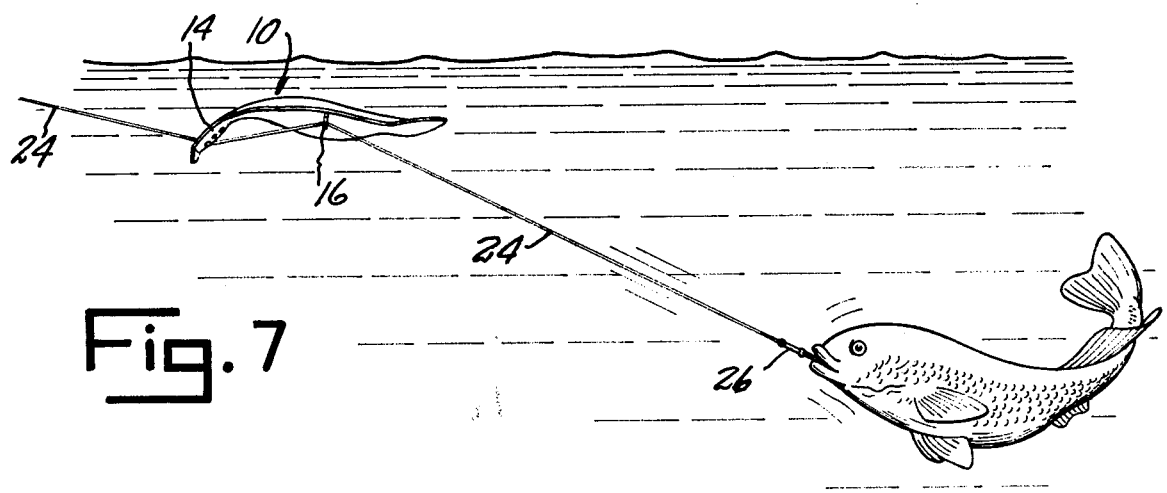
FIG. 7 is a view illustrating a typical relative position of the lure and hook on the fish line incident to landing a fish.

In assembling the lure, a line 24 is passed through a selected one of the apertures 20 and thence through the eyelet 16, and has secured to the end thereof a member 26 of any selected type by means of which a fishhook 28 may be secured to the end of the line. The attachment member 26 may include a swivel, although a swivel is not required. It will be understood, of course, that the opening of the eyelet 16 accommodates free passage of the line therethrough, and that the line attaching means 26 is of a size which cannot pass through the eyelet. When the lure is assembled, the lure body is free to move lengthwise upon the line, that is, to move forwardly upon the line from a trolling or retrieving position as shown in FIG. 1 wherein the hook attaching means 26 abuts the eyelet 16 to a position spaced from the hook as shown in FIG. 4. Also, the lure body is free to rotate about the line and to swing from side to side without imparting any twisting action upon the line. FIG. 7 illustrates a position of the lure upon the line spaced forwardly from the hook as may occur during the landing of a fish which has struck the lure and become hooked.

The lure can readily be cast in conventional manner incident to which the weight of the lure body is a principal factor governing the trajectory of the lure. During the cast the eyelet 16 abuts the hook attaching member 26 so that the hook and the lure body move as a unit in the direction of the cast, although the lure body may rock or rotate laterally upon the line. During trolling or retrieving the shape of the body and the diving plate determine the action of the lure in the water. During such trolling or retrieving a novel lively action is imparted to the lure, characterized by diving, lateral darting and rocking of the lure body. By virtue of the fact that the lure body is advanced by a pushing action of the line attachment member 26 against the eyelet 16, the forward portion of the lure body and the diving plate experiences minimum restraint by the line. This accommodates freedom of the lure body to react with the water in a manner which does not restrain the front of the lure in the manner which occurs when a line is attached to the front of the lure so as to pull the front of the lure body. Thus the lure has a freedom of action which produces lure movement of greater amplitude and lateral darting action than characterizes conventional lures, and also an action with substantial potential for lateral rocking of the body relative to the line in a manner which is substantially different from the action of conventional lures attached at their forward ends to a line to be pulled thereby.

When a fish strikes the lure and is impaled by the hook and attempts to free itself from the hook a thrashing action in the water results. Incident to such thrashing action incident to the movements of the hooked fish and the manuevering of the angler while "playing" the fish, the lure body is free to move along the line to a position spaced or separated from the hook and the fish. Thus, FIG. 7 illustrates a position in which the lure body, while responding to the actions of the fish and the angler, moves along the line independently of the hook and the fish impaled thereon, and thus is not an impediment to the successful landing of the fish by the angler. Also, the freedom of the lure for movement independently of the hook makes it easy for the angler to set the hook after the fish has struck and increases the percentage of successful landings of fish after strikes of the lure by the fish.

Figure 8:
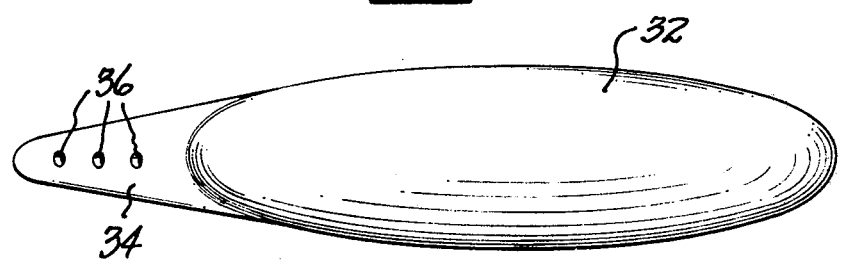
FIG. 8 is a top plan view of a modified embodiment of the invention employing a plug-type body.
Figure 9:
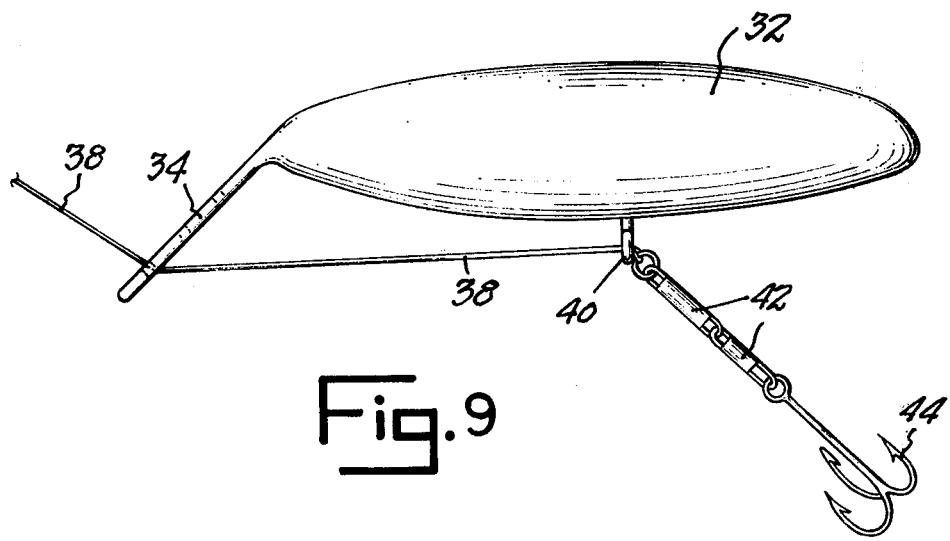
FIG. 9 is a side elevational view of the embodiment of the invention shown in FIG. 8.

Another embodiment of the invention is illustrated in FIGS. 8 and 9 wherein a conventional plug-type body 32 formed of wood, plastic or other buoyant material and of any desired configuration or shape is employed. The plug body 32 carries a diving plate 34 extending from the forward end thereof at an angle to the longitudinal axis of the plug body. The diving plate 34 is provided with one or a plurality of spaced line receiving apertures 36 located along the longitudinal center line thereof through which a fish line 38 may pass freely. It will be understood that suitable grommets, as illustrated in FIG. 6, may be employed in the line receiving apertures 36 to avoid injury to or severing of the line incident to rocking or other action of the lure relative to the line. Longitudinally aligned with the diving plate and projecting in the same direction from the body as does the diving plate is an eyelet 40 which preferably is positioned rearwardly of the longitudinal center of gravity of the lure and which receives the line 38 therethrough freely. Hook attaching member 42 is anchored to the line 38 and is of a size to abut against the eyelet 40 as a means to propel the lure in the water upon a pull upon the line. The hook attaching member has the hook 44 connected thereto.

The embodiment of the invention illustrated in FIGS. 8 and 9 is characterized by the same novel features described above with respect to freedom of the lure body to move along the line in a spaced relation to the hook and hook attaching means and freedom of the lure body to rock laterally relative to the line as the lure is trolled or retrieved. Also, the lure body is pushed at the eyelet 40 to advance it through the water, and the front portion of the lure body is subjected to minimum restraint to lifelike action during trolling and retrieving. This embodiment of the lure may also be cast in conventional manner.

Figure 10:
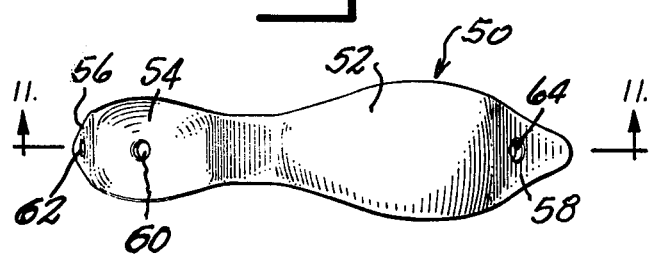
FIG. 10 is a top plan view of another embodiment of the invention.
Figure 11:
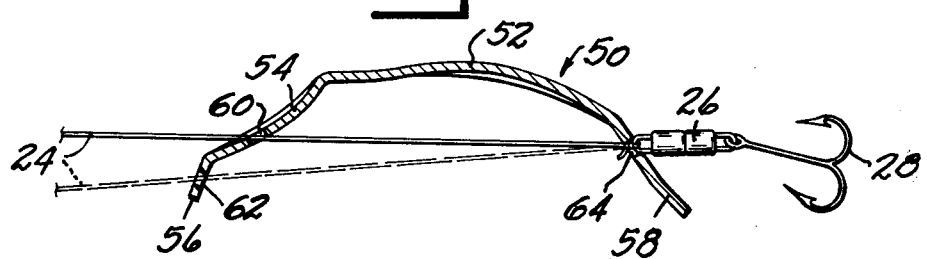
FIG. 11 is a side elevational view of the embodiment shown in FIG. 10, with one line mounting shown in full lines and a second line mounting shown in dotted lines.
Figure 12:
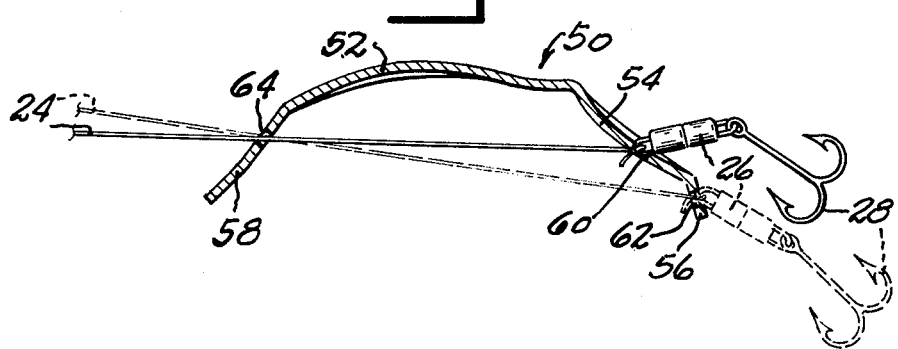
FIG. 12 is a side elevational view of the embodiment shown in FIG. 10 illustrating in full and dotted lines two different arrangements of the lure body, line and hook.

Another embodiment of the invention is shown in FIGS. 10, 11 and 12. This embodiment has a body 50 of the plate or spoon type. The body is characterized by an elongated central longitudinally curved portion 52, an angularly projecting diving plate 54 positioned at one end which terminates in an end portion 56 which extends at a greater angle to the longitudinal axis of the body than does diving plate portion 54. The body has an opposite end portion 58 extending angularly relative to the longitudinal axis of the body in the same direction as parts 54 and 56. Thus, in side elevation, the lure body is generally arched from end to end. Each of the body parts 54, 56 and 58 has an aperture substantially centrally thereof, the same being apertures 60, 62 and 64 respectively. Each aperture is of a size to freely receive line 66.

A characteristic of all embodiments of the invention is illustrated in FIGS. 11 and 12, namely, that either end of each embodiment may be positioned foremost. The actions of all embodiments vary according to position of the lure on the line. In all embodiments the contact of the hook or hook mounting member with the rearmost line guide or part of the lure serves to propel the lure body, as previously described.

While the preferred embodiments of the invention have been illustrated and described, it will be understood that changes in the construction may be made within the scope of the appended claims without departing from the spirit of the invention.

What I claim is:

1. A fishing lure comprising an elongated body including an angularly outwardly extending part at the foremost end thereof having a line receiving aperture, and a line guide projecting laterally from said body in substantially the same direction as said angularly extending part at a part of said body spaced rearwardly from said angularly extending part and rearwardly of the longitudinal center of gravity of said body whereby a line extends alongside and clear of said body rearwardly of said foremost line-receiving aperture.

2. A fishing lure comprising an elongated body including an angularly outwardly extending part at one end thereof having a line-receiving aperture, a line guide projecting laterally from said body in substantially the same direction as said angularly extending part and spaced longitudinally from said angularly extending part and rearwardly of the longitudinal center of gravity of said body, a line passing freely through said aperture and line guide and alongside and spaced from said body and a hook connected to said line, said body being shiftable longitudinally and rotatively on said line and relative to said hook.

3. A fishing lure as defined in claim 2, wherein said angularly extending part has a plurality of longitudinally spaced apertures therein, said line extending freely through a selected aperture.

4. A fishing lure as defined in claim 2, and hook-attaching means secured on said line and abutting said line guide to advance said lure body upon endwise pull on said line.

5. A fishing lure as defined in claim 2, wherein said body is a metal spoon and said angularly extending body part is a diving plate.

6. A fishing lure as defined in claim 2, wherein said body is a buoyant member and said angularly extending body part is a diving plate.

7. A fishing lure as defined in claim 2, wherein said angularly extending body part is a diving plate, and a grommet is mounted in said line-receiving aperture.

* * * * *